Oct. 6, 1931.    M. E. GUERMONT    1,826,346
FLUID METER
Filed May 10, 1930
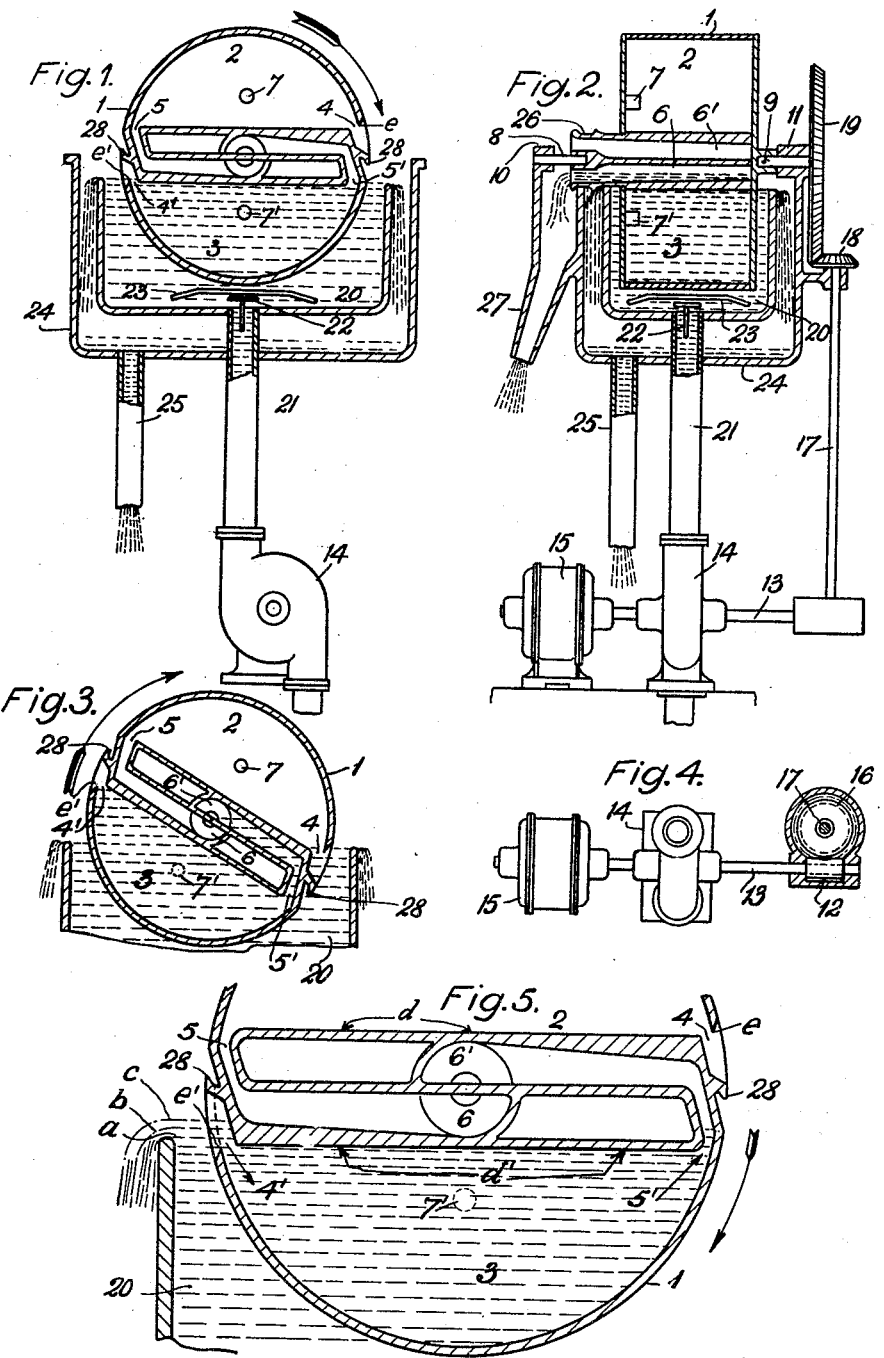
INVENTOR.
Miguel Enrique Guermont.
By Arthur J. Stephens
ATTORNEY.

Patented Oct. 6, 1931

1,826,346

UNITED STATES PATENT OFFICE

MIGUEL ENRIQUE GUERMONT, OF LONDON, ENGLAND, ASSIGNOR TO S. I. A. M. LIMITED, OF LONDON, ENGLAND, A COMPANY OF GREAT BRITAIN

FLUID METER

Application filed May 10, 1930, Serial No. 451,469, and in Germany September 13, 1929.

The present invention relates to improvements in fluid meters of the dipping class for use in garages and other filling stations.

Heretofore meters of the dipping class have been capable of dealing with only small quantites of fluid at a slow rate of speed.

Weight driven fluid meters have been suggested in which a rotating drum receives the fluid to be measured through an inlet about its centre adapted to feed the fluid in succession to a set of spaced measuring compartments in the interior of the drum which compartments intermittently and automatically rotate the drum when each compartment is filled with the measured quantity of fluid the drum moving to a position where the filled compartment will discharge its contents through its outlet in the periphery of the pump. It will be obvious that as with the meters of the dipping class these weight driven fluid meters can only rotate at a slow rate of speed.

This invention relates to fluid meters of the dipping class in which a measuring chamber or chambers in the form of a drum is rotated at a speed proportional to the speed of the pump in a vessel in which the fluid to be measured is maintained at constant level by said pump.

The present invention is designed to provide a fluid meter for separating measured quantities of fluid which is capable of dealing with considerable volumes at high and variable speeds of the rotating drum type but with inlets to the measuring compartments on the periphery of the drum and a central outlet. The drum containing the measuring chamber is mechanically rotated from the pump and at one part of the revolution each chamber is wholly immersed in the fluid with its peripheral inlet uppermost, while during the remainder of the revolution all parts of the chamber are in turn lifted above its central outlet. The level of fluid in the containing vessel is kept constant by pumping the fluid into it at a greater rate than the meter can remove it so that there is always an overflow from the vessel. To ensure this at whatever speed the meter is working the pump and meter are geared together so that their speeds are always proportional, and the pump always delivers more fluid than the meter takes up. In order that such small variations of the overflow level as are inevitable may not appreciably affect the accuracy of measurement, the measuring chambers have narrow inlets and outlets, so that the rate of change of volume with level in the wholly immersed position of the chamber is very small.

A construction embodying the invention is shown by way of example in the accompanying drawings.

Figure 1 is a section of the meter at right angles to the shaft of the measuring chambers.

Figure 2 is a section through the shaft of the measuring chambers.

Figure 3 is a section corresponding to Figure 1 of the measuring chambers only showing the position at the beginning of the discharge.

Figure 4 is a plan of the pump unit and

Figure 5 is an enlarged section of a measuring chamber at right angles to the shaft.

In the construction shown the drum 1 is divided into two measuring chambers 2 and 3 by a diametral partition each chamber being bounded by a straight wall paralled with the partition joined to it at one end and at the other end joined to the wall of the drum. By this means each chamber is formed with a narrow inlet 4 or 4' and a narrow outlet 5 or 5', the outlets comunicating through the passages 6 and 6' with a central delivery channel. Means 7 and 7' are provided in each chamber for varying the volume of the chamber so that it may be calibrated precisely.

The drum 1 is carried upon trunnions 8 and 9 rotating in bearings 10 and 11. It is driven by a worm 12 on the shaft 13 of a pump 14 which in turn is driven by an electric motor 15. The worm 12 meshes with a worm wheel 16 on the shaft 17 which drives the trunnion 9 through bevel gears 18 and 19. By this means the rate of rotation of the measuring chambers is always proportional to the rate of supply of liquid by the pump 14.

The pump delivers liquid to a vessel 20 through the pipe 21 and a check valve 22, a baffle 23 being provided above the valve 22 to spread the incoming flow and prevent undue turbulence. The pump is designed to deliver more fluid than the measuring drum 1 can take up so that there is always an overflow over the edges of the vessel 20 into the surrounding vessel 24 from which the fluid escapes through the pipe 25 to the tank from which it is drawn. The central delivery passage into which channels 6 and 6' open is extended at 26 over the vessel 24 so that the fluid separated by the measuring chamber is delivered into the spout 27.

Ribs 28 upon the junction between the straight walls of the measuring chambers and the wall of the drum 1 form gutters into which any liquid carried up on the outer surface of the drum 1 runs and is run off at one end so that it cannot drip into the adjacent measuring chamber.

The working of the apparatus can be best understood from Figure 5. In the position shown in which the chamber 3 is fully immersed, it will be seen that the upper flat bounding wall $d$ or $d'$ of the chamber is beneath the level $a$ of the edge of the vessel 20. Since there is a constant overflow the level of the fluid will stand a little above the level $a$. But as the length of lip of the vessel 20 from which overflow can take place is very long even a considerable difference in the rate of overflow will make but very little difference to the level, lifting it at most, say, to the level $c$. As the inlet 4 and outlet 5 are very narrow any fluctuation of level between $a$ and $c$ will make very little difference indeed to the volume of fluid contained in the chamber 3. The volume may be reckoned upon an average level $b$. Separation of the measured quantity of liquid is completed as soon as the lip $e$ or $e'$ reaches the surface.

The emptying of the chamber will be understood from Figure 3. By the continued revolution of the drum the level of the liquid in the chamber 3 has been raised to that of the central passage 26 and accordingly the liquid begins to flow out through 5' and 6' as indicated. Since the inner surface of the wall $d$ or $d'$ leading to the passage 6 is inclined all the fluid left in the chamber when the drum has rotated through 180° from the position shown in Figure 5 will run down to the centre and will completely empty while the other chamber is refilling.

If desired a constant level may be maintained in the vessel 20 by means of a valve controlled by a float or in any other convenient fashion.

Instead of the mechanical drive shown, the drum can be rotated by a fluid motor which is energized by the passage therethrough of a stream of fluid raised by the pump to the vessel in which the drum meter rotates. The fluid motor and consequently the drum meter is rotated by the stream of fluid raised by the pump to the containing vessel at a speed which is proportional to the speed of the pump and which ensures that the pump delivers more fluid to the vessel than the drum meter takes up from said vessel.

What I claim is:—

1. A fluid meter of the dipping class for use in garages and other filling stations comprising a vessel adapted to contain the fluid to be measured, a drum meter mounted in said vessel, a pump adapted to supply fluid to said vessel, and means for operating said pump and simultaneously rotating said drum meter in said vessel at a speed which is proportional to the speed of said pump and which ensures that the pump delivers more fluid to the vessel than the drum meter takes up from said vessel.

2. A fluid meter of the dipping class for use in garages and other filling stations comprising a vessel adapted to contain the fluid to be measured, a drum meter mounted in said vessel, a pump adapted to supply fluid to said vessel, a motor for operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel.

3. A fluid meter of the dipping class for use in garages and other filling stations comprising a vessel adapted to contain the fluid to be measured, a drum meter containing the measuring chamber with a peripheral inlet and an internal outlet mounted in said vessel, a pump adapted to supply fluid to said vessel and means for operating said pump and simultaneously rotating said drum meter in said vessel at a speed which is proportional to the speed of said pump and which ensures that the pump delivers more fluid to the vessel than the drum meter takes up from said vessel.

4. A fluid meter of the dipping class for use in garages and other filling stations comprising a vessel adapted to contain the fluid to be measured, a drum meter containing the measuring chamber with a peripheral inlet and an internal outlet mounted in said vessel, a pump adapted to supply fluid to said vessel, a motor operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel.

5. A fluid meter of the dipping class for use in garages and other filling stations comprising a vessel adapted to contain the fluid to be measured, a drum meter mounted in said vessel, a pump adapted to supply fluid to said vessel, a motor for operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel, a diametral partition in said drum and a measuring chamber on each side of said partition provided respectively with opposite peripheral inlets and internal outlets therefrom communicating with a central delivery channel and so positioned that each measuring chamber is wholly immersed with its peripheral inlet upwards in one part of the revolution of the drum and wholly above the fluid level with its internal outlet downwards in another part of the revolution.

6. A fluid meter of the dipping class for use in garages and other filling stations comprising a vessel adapted to contain the fluid to be measured, a drum meter mounted in said vessel, a pump adapted to supply fluid to said vessel, a motor for operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel, a diametral partition in said drum, a measuring chamber on each side of said partition bounded by a straight wall parallel with the partition and joined to it at one end and at the other end joined to the wall of the drum thus forming opposite peripheral narrow inlets to said chambers and narrow internal outlets therefrom communicating with a central delivery channel and so positioned that each measuring chamber is wholly immersed with its peripheral inlets upwards in one part of the revolution of the drum and wholly above the fluid level with its internal outlet downwards in another part of the revolution.

7. A fluid meter of the dipping class for use in garages and other filling stations comprising a vessel adapted to contain the fluid to be measured, a drum meter mounted in said vessel, a pump adapted to supply fluid to said vessel, a motor for operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel, a diametral partition in said drum, a measuring chamber on each side of said partition bounded by a straight wall parallel with the partition joined to it at one end and at the other end joined to the wall of the drum thus forming opposite peripheral narrow inlets to said chamber and narrow internal outlets therefrom communicating with a central delivery channel and so positioned that each measuring chamber is wholly immersed with its peripheral inlet upwards in one part of the revolution of the drum and wholly above the fluid level with its internal outlet downwards in another part of the revolution, and gutters respectively formed on the junction between the straight walls of each measuring chamber and the wall of the drum adapted to prevent fluid on the surface of the drum from entering the adjacent measuring vessel.

8. A fluid meter of the dipping class for use in garages and other filling stations comprising a vessel adapted to contain the fluid to be measured, a drum meter mounted in said vessel, a pump adapted to supply fluid to said vessel, a motor for operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel, a diametral partition in said drum and a measuring chamber on each side of said partition provided respectively with opposite peripheral inlets and internal outlets therefrom communicating with a central delivery channel and so positioned that each measuring chamber is wholly immersed with its peripheral inlet upwards in one part of the revolution of the drum and wholly above the fluid level with its internal outlet downwards in another part of the revolution.

9. A fluid meter of the dipping class for use in garages and other filling stations comprising a vessel adapted to contain the fluid to be measured, a drum meter mounted in said vessel, a pump adapted to supply fluid to said vessel, a motor for operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel, a diametral partition in said drum, a measuring chamber on each side of said partition bounded by a straight wall parallel with the partition joined to it at one end and at the other end joined to the wall of the drum thus forming opposite peripheral narrow inlets to said chambers and narrow internal outlets therefrom communicating with a central delivery channel and so positioned that each measuring chamber is wholly immersed with its peripheral inlet upwards in one part of the revolution of the drum and wholly above the fluid level with its internal outlet downwards in another part of the revolution.

10. A fluid meter of the dipping class for use in garages and other filling stations comprising a vessel adapted to contain the fluid to be measured, a drum meter mounted in said vessel, a pump adapted to supply fluid to said vessel, a motor for operating said pump, and gearing connecting said pump with said drum meter adapted to simultaneously rotate said drum meter in said vessel at a speed which is proportional to the speed of said pump and which ensures that the pump delivers more fluid to the vessel than the drum meter takes up from said vessel, a diametral partition in said drum, a measuring chamber on each side of said partition bounded by a straight wall parallel with the partition joined to it at one end and at the other end joined to the wall of the drum thus forming opposite peripheral narrow inlets to said chamber and narrow internal outlets therefrom communicating with a central delivery channel and so positioned that each measuring chamber is wholly immersed with its peripheral inlet upwards in one part of the revolution of the drum and wholly above the fluid level with its internal outlet downwards in another part of the revolution and gutters respectively formed on the junction between the straight wall of each measuring chamber and the wall of the drum adapted to prevent fluid on the surface of the drum from entering the adjacent measuring vessel.

In testimony whereof I have signed my name to this specification.

MIGUEL ENRIQUE GUERMONT.